Patented June 25, 1935

2,006,157

UNITED STATES PATENT OFFICE 2,006,157

SYNTHETIC ALCOHOL

Benjamin T. Brooks, Old Greenwich, Conn., and Reuben Schuler, Elizabeth, N. J., assignors to Standard Alcohol Company No Drawing. Application December 1, 1933, Serial No. 700,611

8 Claims. (Cl. 260—156)

The present invention relates to the manufacture of alcohols, and particularly to an improvement in the adsorption of olefins in sulfuric acid and their reactions with that acid.

In the manufacture of alcohols from olefins by the action of sulfuric acid of appropriate concentration, the general practice is to dilute the acid reaction mixture to hydrolyze the alkyl sulfates and distill off the alcohol or alcohols produced. In the manufacture of ethyl and isopropyl alcohol in this way, substantial proportions of the ethers, ethyl and di-isopropyl ether, may be produced. The proportions of ether are greater if relatively little water is used to dilute the sulfuric acid reaction mixture. Thus dilution of an ethylene sulfuric acid reaction mixture with water to a degree corresponding to 40% sulfuric acid, all the acid being considered as $H_2SO_4$, and then distilling the aqueous solution, gave about 15 volumes of ethyl ether to 75 volumes of 95% ethyl alcohol. Di-isopropyl ether is also produced when dilute acid solutions of isopropyl sulfate are distilled.

In co-pending application Serial No. 700,610, filed December 1, 1933, by Benjamin T. Brooks and Reuben Schuler, it was shown that the conversion of ethyl ether to ethyl sulfuric acid takes place when the ether, dissolved in sulfuric acid, is heated to 80°–120° C. When concentrated sulfuric acid, 93 to 95% $H_2SO_4$ is used, the conversion is about 80% complete when the mixture is maintained for two hours at 110° C.

An object of the present invention is to increase the yield of alcohols in the reaction of sulfuric acid with olefins, followed by hydrolysis, while at the same time avoiding the formation of ethers.

According to the present invention, it is found that sulfuric acid containing relatively small proportions of ethers reacts more rapidly with the olefins than the acid without the ethers.

The ether is probably in the combined form generally believed to be an oxonium salt or a form of addition product which readily yields ether on diluting the acid with water. As has been shown in the above mentioned co-pending application, the conversion of this ether-acid compound to alkyl sulfuric acid requires an appreciable time at temperatures within the range of 50° and 120° C.

In the conversion of ethylene to ethyl alcohol by treating it with concentrated sulfuric acid followed by hydrolysis of the ethyl or di-ethyl sulfates and distillation of the hydrolyzed mixture, a certain amount of ethyl ether is produced. When the acid mixture is diluted with water in proportions equivalent to 60 parts of water to 40 parts by weight of sulfuric acid and the mixture distilled, the proportion of ether produced may be as much as 15 parts of ether to 75 parts of alcohol.

The ether may be produced in the original acid reaction mixture before dilution or it may be produced during the distillation of the diluted mixture. Whatever may be the explanation of its formation, it is found that in the first stages of the reaction between the ethylene and the acid containing combined ether, the absorption of the ethylene is much more rapid than when using acid alone.

Since the reaction of the acid with ethylene is carried out at 80° to 120° C., the ether compound is partially converted to ethyl sulfuric acid so that the net result of putting back into the cycle the ether obtained when the hydrolyzed acid product is distilled, is substantially to eliminate ether as a product of the reaction. An explanation of this result may be that the ether exists in a state of chemical equilibrium either in the concentrated acid reaction mixture or in the diluted acid mixture during distillation. In any case, it is well known that distillation of ethyl sulfuric acid solutions diluted with small proportions of water yield more ether than when diluted with large proportions of water. There is accordingly a substantial saving in sulfuric acid concentration cost if excessive dilution with water is avoided.

There is a substantial proportion, 5 to 10%, of ether formed even when the acid reaction product is diluted to 20 parts $H_2SO_4$ to 80 parts of water. It is found, however, that by diluting the acid reaction product to the equivalent of 40 to 45 parts of $H_2SO_4$ to 60 to 55 parts of water and returning the ether formed to successive lots of fresh sulfuric acid used in the reaction with the ethylene, ethyl ether can be substantially eliminated as one of the net or final products of the process, at the same time gaining the advantage of the more rapid absorption and reaction of the ethylene in the early stages of the reaction.

The above example is for illustration only as the present process may be used in preparing other alcohols such as isopropyl, isobutyl, etc. Other strong mineral acids may be used, though sulfuric acid is found to be preferable. The concentrations of sulfuric acid used are from 50% to 100%, higher temperatures being used when weaker acids are used for preparing the acid reaction mixture.

The foregoing description is merely illustrative and alternative arrangement may be made within the scope of the appended claims in which it is our intention to claim all novelty as broadly as the prior art permits.

We claim:

1. In the manufacture of an alcohol, the process which comprises contacting under absorption conditions an olefin with sulfuric acid containing a substantial quantity of an ether.

2. In the manufacture of ethyl alcohol, the process which comprises contacting under absorption conditions ethylene with sulfuric acid containing at least 10% of ethyl ether.

3. In the manufacture of ethyl alcohol, the process which comprises contacting ethylene with sulfuric acid containing at least 10% of ethyl ether at a temperature between 70° to 110° C.

4. In the manufacture of ethyl alcohol, the process which comprises contacting under absorption conditions a gas containing ethylene with sulfuric acid containing a substantial quantity of ethyl ether.

5. In the manufacture of ethyl alcohol, the process which comprises contacting under absorption conditions gas containing ethylene with sulfuric acid containing at least 10% of ethyl ether.

6. In the manufacture of ethyl alcohol, the process which comprises contacting a gas containing ethylene with sulfuric acid containing at least 10% of ethyl ether at a temperature between 70° and 110° C.

7. In the manufacture of an alcohol, the process which comprises contacting under absorption conditions an olefin with sulfuric acid of 50% to 100% strength containing at least 10% of an ether.

8. In the manufacture of an alcohol from an olefin, the process which comprises forming the alcohol under conditions to produce also an ether, adding to sulfuric acid a substantial quantity of such ether, and utilizing the sulfuric acid to absorb further quantities of the olefin.

BENJAMIN T. BROOKS.
REUBEN SCHULER.